(12) United States Patent
Chang et al.

(10) Patent No.: US 8,950,255 B2
(45) Date of Patent: Feb. 10, 2015

(54) SENSING DEVICE FOR DETECTING MATERIAL DEPTH, LIQUID-LEVEL, AND TEMPERATURE

(75) Inventors: Liang-Chi Chang, New Taipei (TW); Cheng-Lun Chang, New Taipei (TW); Ching-Jui Chen, New Taipei (TW); Chao-Kai Cheng, New Taipei (TW)

(73) Assignee: Finetek Co., Ltd., New Taipei (TW)

( * ) Notice: Subject to any disclaimer, the term of this patent is extended or adjusted under 35 U.S.C. 154(b) by 351 days.

(21) Appl. No.: 13/463,089

(22) Filed: May 3, 2012

(65) Prior Publication Data
US 2013/0182742 A1     Jul. 18, 2013

(30) Foreign Application Priority Data

Jan. 18, 2012   (TW) .............................. 101101909 A

(51) Int. Cl.
*G01F 23/22*     (2006.01)

(52) U.S. Cl.
CPC ...................................... *G01F 23/22* (2013.01)
USPC ......................................... 73/292; 73/304 C

(58) Field of Classification Search
CPC .............................. G01F 23/266; G01F 23/268
USPC .................................. 73/290 V, 304 R, 304 C
See application file for complete search history.

(56) References Cited

U.S. PATENT DOCUMENTS

| 5,156,042 | A  | * | 10/1992 | Carlin et al. ................... 73/49.2 |
| 2002/0053239 | A1 | * | 5/2002 | Fehrenbach et al. ........ 73/290 V |
| 2004/0183550 | A1 | * | 9/2004 | Fehrenbach et al. .......... 324/662 |
| 2004/0200277 | A1 | * | 10/2004 | Feldstein et al. ............ 73/304 R |
| 2005/0188776 | A1 | * | 9/2005 | Kunter et al. ................ 73/865.9 |

* cited by examiner

*Primary Examiner* — Peter Macchiarolo
*Assistant Examiner* — Nathaniel Kolb
(74) *Attorney, Agent, or Firm* — Chun-Ming Shih; HDLS IPR Services

(57) ABSTRACT

A sensing device can detect material depth, liquid-level, and temperature. The sensing device has a probe, a control module, a volume sensing module, a thermal sensing module, an output module, and a power module. The probe has two material electrodes connected to the volume sensing module and a thermal electrode connected to the thermal sensing module. A rated voltage is applied at the material electrodes based on radio frequency admittance. A current deviation of the material electrodes is obtained by the volume sensing module, and calculated via the control module by material characteristics to obtain a correct storage amount of material. A temperature at each material depth is correctly detected by the thermal electrode. Steel cable is used as the material of the material electrodes of the probe to detect material depth or liquid level with high impact resistant ability.

20 Claims, 4 Drawing Sheets

SENSING DEVICE FOR DETECTING MATERIAL DEPTH, LIQUID-LEVEL, AND TEMPERATURE

BACKGROUND OF THE INVENTION

1. Field of the Invention

This invention relates to a sensing device, especially to a sensing device for detecting material depth, liquid-level, and temperature.

2. Description of Related Art

A sensing device for detecting material depth and liquid-level is very important. The sensing device can be applied to petrochemical industry, food industry, feed industry, steel industry, cement industry, etc. The sensing device is to detect a storage amount of material in a warehouse for a monitoring purpose.

The conventional sensing device only can detect either material depth or liquid-level. The material or the liquid such as gasoline, coalmine, iron sands, cement, corns, wheat, wheat flour, or liquid can be detected. There are multiple thermal sensors installed in the sensing device for detecting material depth or liquid-level, so the sensing device can respectively monitor the material depth and temperature, or the liquid-level and temperature. The liquid-level can be detected through different approaches as follows.

1. The sensing device uses an impulse voltage to generate a magnetic field variation for detecting the liquid-level.
2. The sensing device measures an electric conductivity of liquid to obtain the liquid-level.
3. The sensing device measures variations of liquid tension and impedance to calculate the liquid-level.

The liquid-level sensing device as stated above cannot measure solid because a probe of the sensing device is easily broken by impact and the liquid-level is calculated based on a physical vibration of the liquid. When the material in the warehouse is changed, the sensing device needs to be promptly changed to accommodate the new material for monitoring.

According to the issue as above, how to obtain information of temperature, material depth, and liquid level by the same sensing device needs to be further explored.

SUMMARY OF THE INVENTION

This invention provides a sensing device for detecting material depth, liquid-level, and temperature. When material is changed in a warehouse, users can keep on monitoring information of the material depth and liquid-level without changing the sensing device.

To accomplish the objective of this invention, the sensing device contains a probe, a control module, a volume sensing module, a thermal sensing module, an output module, and a power module.

The probe contains two material electrodes and a thermal electrode.

The control module contains at least one thermal signal input terminal, at least one volume signal input terminal, multiple signal output terminals, and a power input terminal.

The volume sensing module contains a first signal processing unit, a first analog-digital converter, and a waveform generating unit. An output terminal of the first analog-digital converter is connected to the volume signal input terminal of the control module. A signal inputted from the probe is processed by the first signal processing unit and transmitted to the control module via the first analog-digital converter. The waveform generating unit is controlled by the control module, and outputs the signal to the material electrodes of the probe for measurement based on radio frequency admittance.

The thermal sensing module contains a second signal processing unit and a second analog-digital converter. A thermal signal inputted from the thermal electrode of the probe is processed by the second signal processing unit. An input terminal of the second analog-digital converter is connected to an output terminal of the second signal processing unit. The thermal signal is converted to a digital signal and transmitted to the control module.

The output module contains a signal input terminal and a signal output terminal. The signal input terminal is connected to part of the multiple signal output terminals of the control module.

The power module contains at least one DC to DC converter for providing working power to the control module, the volume sensing module, the thermal sensing module, the probe, and the output module.

The waveform generating unit of the volume sensing module generates a triggering signal to provide to the material electrodes of the probe. A particular frequency signal is outputted from the probe and obtained by the first signal processing unit of the volume sensing module, wherein the particular frequency signal corresponds to the waveform generating unit.

Multiple thermal sensors are mounted on the thermal electrode of the probe. The thermal sensing module obtains the thermal signal by the thermal sensors of the probe. The thermal signal is transmitted to the control module via the second signal processing unit and the second analog-digital converter. A correct temperature of the material can be calculated by the control module for the users.

The material electrodes of the probe detect material volume based on radio frequency admittance. A rated voltage is applied at the material electrodes by the power module. The volume sensing module detects a current deviation between the material electrodes and a ground potential. The current deviation usually correlates with material volume, a dielectric constant, thermal function, and especially a frequency of a constant voltage. When a particular current deviation is measured, a volume signal is generated from a triggering signal generated by the waveform generating unit. Then the volume signal is converted to a digital signal and outputted to the control module. The control module converts the digital signal to obtain material volume based on radio frequency admittance.

The sensing device obtains material volume information from the material electrodes of the probe, and obtains thermal information from the thermal electrode. The material volume information and the thermal information are respectively converted to digital signals by the volume sensing module and thermal sensing module, and the digital signals are outputted to the control module for calculating a correct value. By said means, the sensing device can calculate by the corresponding material information to obtain the correct temperature and volume by the control module. The users can correctly monitor the temperature information and the volume information.

The sensing device of this invention calculates the actual material volume based on radio frequency admittance. Even though the material is changed in the warehouse, the sensing device does not have to be changed, and both of the material information and the thermal information can be obtained simultaneously.

DETAILED DESCRIPTION OF PREFERRED EMBODIMENT

Figure 1A:
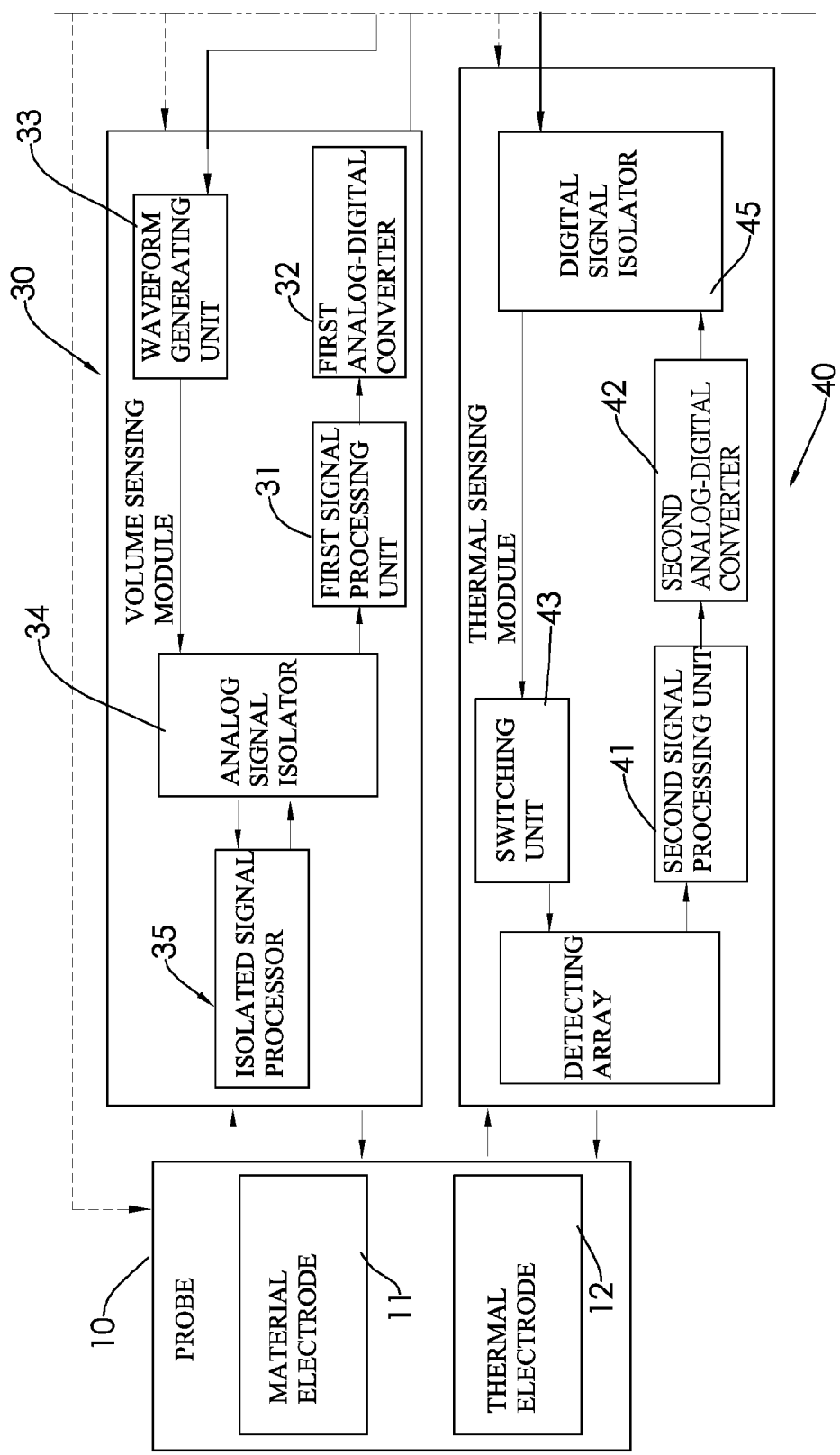
FIGS. 1A and 1B are a circuit block diagram of a sensing device of this invention.
Figure 1B:
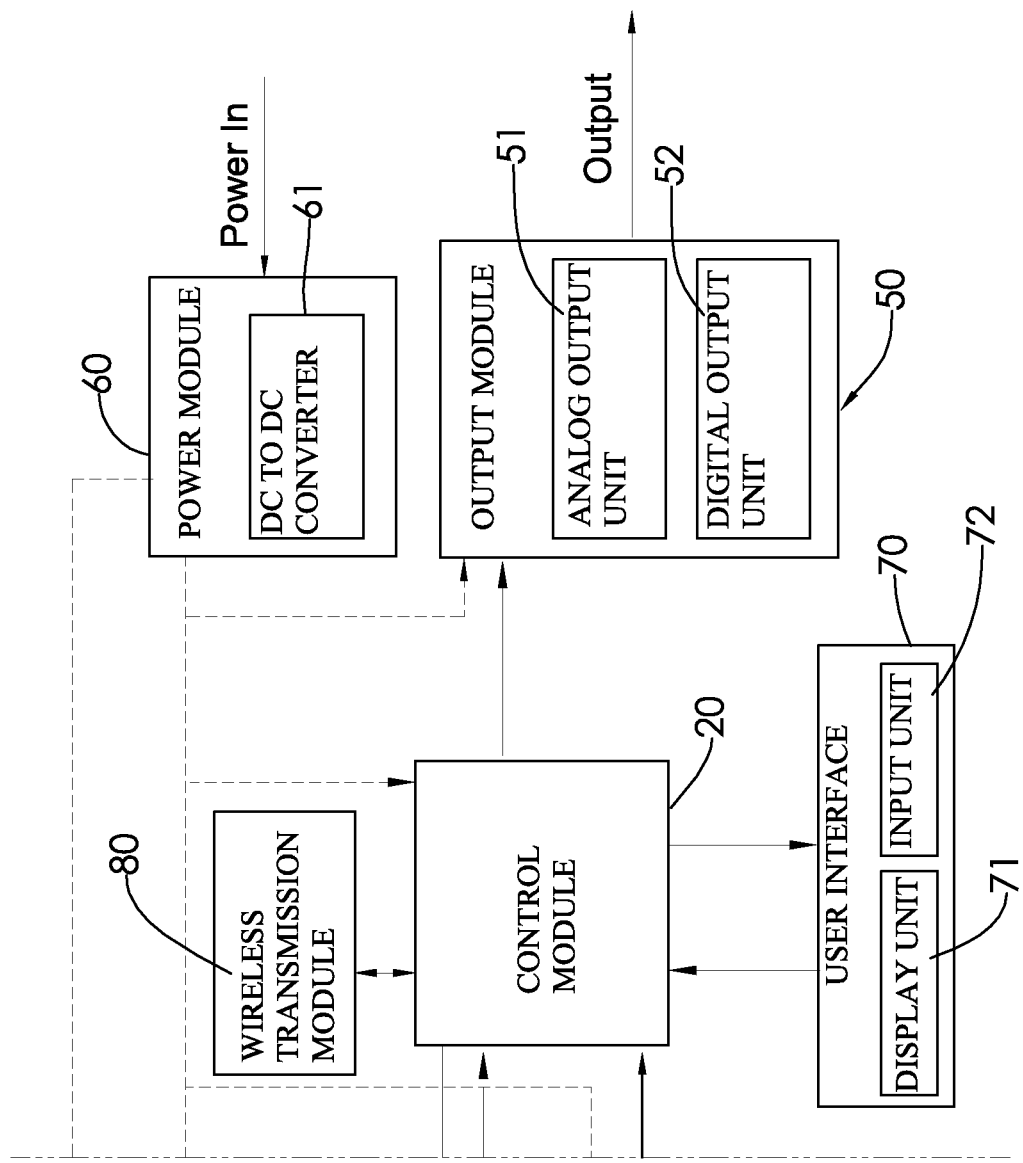

FIGS. 1A and 1B are an embodiment of this invention. A sensing device has a probe 10, a control module 20, a volume sensing module 30, a thermal sensing module 40, an output module 50, and a power module 60.

Figure 2:
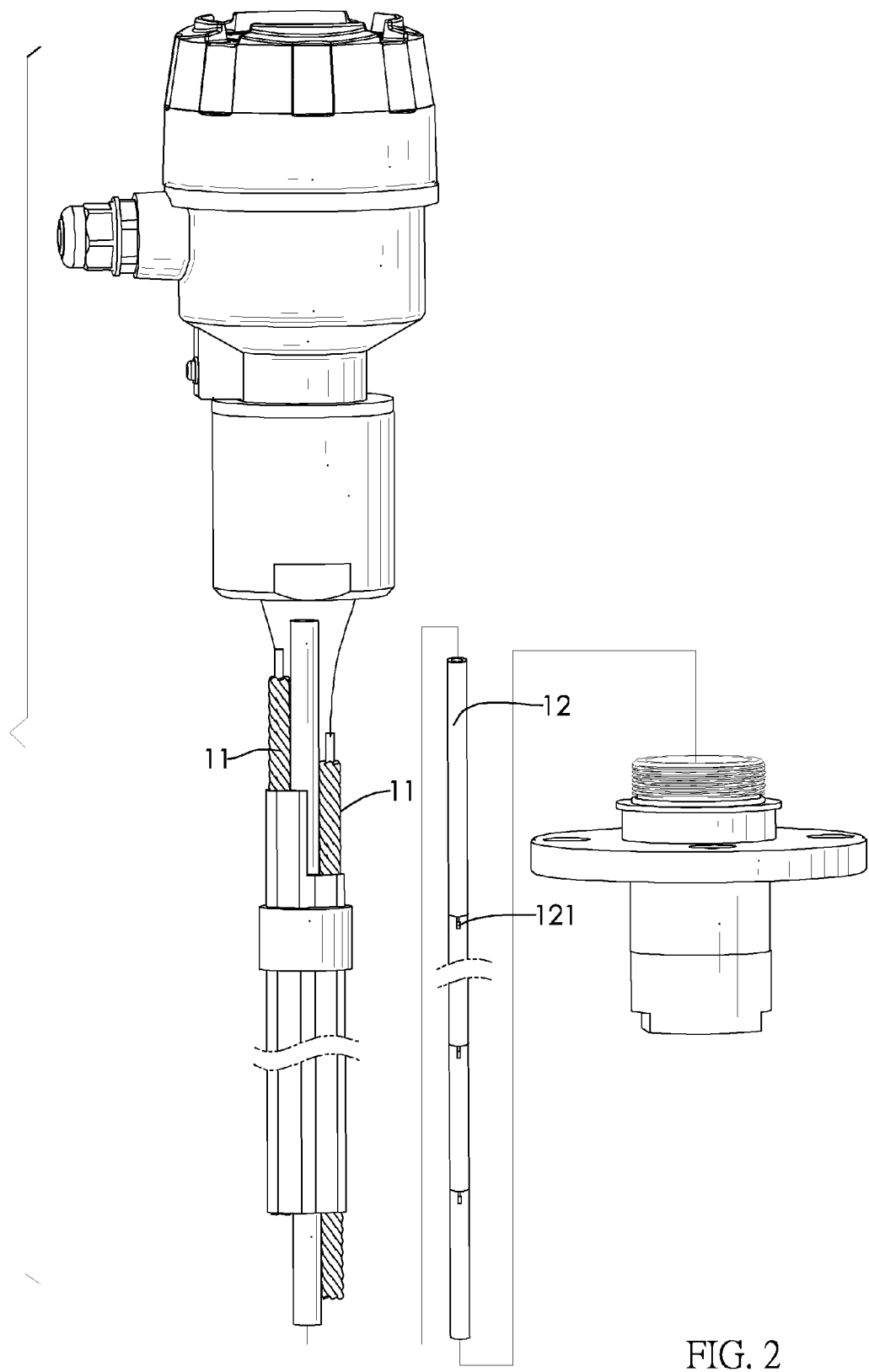
FIG. 2 is an exploded diagram of a probe of this invention.
Figure 3:
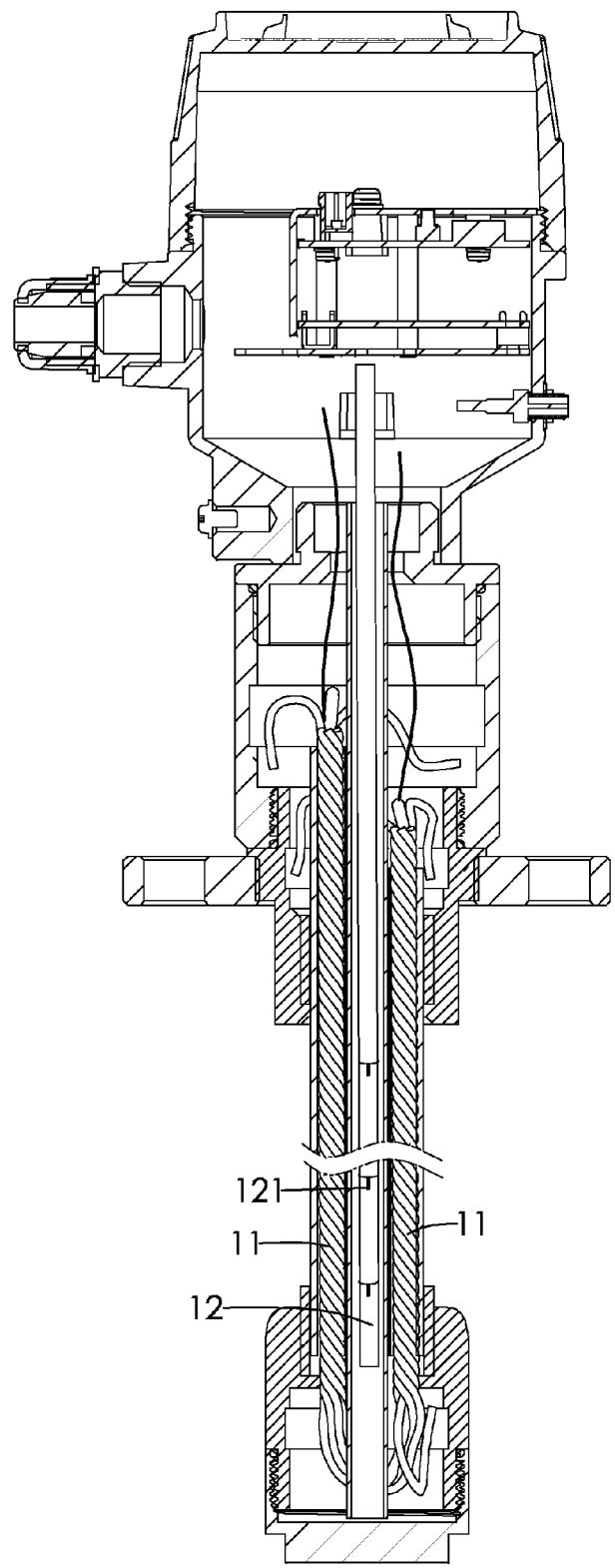
FIG. 3 is a cross sectional view of this invention.

The probe 10 contains two material electrodes 11 and a thermal electrode 12. The thermal electrode 12 contains multiple thermal sensors 121 as shown in FIG. 2. In this embodiment, the thermal electrode 12 is placed between the two material electrodes 11 and is in the form of a long rod as shown in FIG. 3. The two material electrodes are manufactured by steel cable for transmitting signals, and provide better impact resistant ability and loading ability.

The control module 20 contains at least one thermal signal input terminal, at least one volume signal input terminal, multiple signal output terminals, and a power input terminal.

The volume sensing module 30 contains a first signal processing unit 31, a first analog-digital converter 32, and a waveform generating unit 33. An output terminal of the first analog-digital converter 32 is connected to the volume signal input terminal of the control module 20. The first signal processing unit 31 processes a signal inputted from the probe 10, and the signal is transmitted to the control module 20 by the first analog-digital converter 32. Correct volume information can be calculated based on radio frequency admittance. The waveform generating unit 33 is controlled by the control module 20, and outputs the signal to the material electrodes 11 of the probe 10 for measurement based on radio frequency admittance. In this embodiment, the volume sensing module 30 further includes an analog signal isolator 34 and an isolated signal processor 35. The isolated signal processor 35 is connected between the analog signal isolator 34 and the probe 10. The isolated signal processor 35 removes noise from the signal transmitted from the probe 10 to avoid misjudgment. Two input terminals of the analog signal isolator 34 are respectively connected to an output terminal of the isolated signal processor 35 and an output terminal of the waveform generating unit 33. Two output terminals of the analog signal isolator 34 are respectively connected to an input terminal of the isolated signal processor 35 and an input terminal of the first signal processing unit 31. The analog signal isolator 34 can protect the volume sensing module 30 from being damaged by a high voltage or a high current caused by an incorrect circuit connection.

The thermal sensing module 40 contains a second signal processing unit 41, a second analog-digital converter 42, a switching unit 43, and a detecting array 44. The detecting array 44 obtains a thermal signal from the probe 10. The thermal signal is provided by the thermal sensor 121 of the thermal electrode 12, and is calculated and outputted by the second signal processing unit 41. An input terminal of the second analog-digital converter 42 is connected to an output terminal of the second signal processing unit 41, so the thermal signal is obtained from the second signal processing unit 41 and converted to a digital signal outputted to the control module 20. The switching unit 43 is controlled by the control module 20 for outputting a signal to the detecting array 44 for adjusting thermal sensing sensitivity. In this embodiment, the thermal sensing module 40 further contains a digital signal isolator 45 which can protect the thermal sensing module 40 from being damaged by a high voltage or a high current caused by an incorrect circuit connection.

The output module 50 has a signal input terminal and a signal output terminal. The signal input terminal is connected to part of the multiple signal output terminals of control module 20. In this embodiment, the output module 50 further contains an analog output unit 51 and a digital output unit 52, so the output module 50 can, depending on requests, output signals to an external receiving terminal. The output module 50 outputs signals that are conformed to an industry signal standard such as 0~10 V or 0~20 mA.

The power module 60 contains at least one DC to DC converter 61 for providing working power to the control module 20, the volume sensing module 30, the thermal sensing module 40, and the output module 50. The power module 60 is controlled by the control module 20 to provide a rated voltage to the material electrodes 11 of the probe 10.

In this embodiment, the sensing device further contains a user interface 70 and a wireless transmission module 80. The user interface 70 contains a display unit 71 and an input unit 72. The input unit 72 can be a keyboard or a touch panel operated by users to enter control instructions. The display 71 can show a current sensing situation or sensing information from the sensing device. The wireless transmission module 80 can transmit data to an external computer or a central control console.

In this embodiment, the material electrodes 11 of the probe 10 function as an material sensing interface for the volume sensing module 30, and detect material volume based on radio frequency admittance. When a rated voltage is applied at the material electrodes 11 and a triggering signal is generated by the waveform generating unit 33, the volume sensing module 30 detects a current deviation between the material electrodes 11 and a ground potential. A volume signal is generated from the triggering signal. The volume signal is converted to a digital signal and outputted to the control module 20. The control module 20 converts the digital signal to obtain material volume based on radio frequency admittance. The current deviation usually correlates with material volume, a dielectric constant, thermal function, and especially frequency of a constant voltage. When a particular current deviation is measured, the particular current deviation is converted to the digital signal. The control module 20 converts the digital signal to obtain material volume based on radio frequency admittance. The multiple thermal sensors 121 are respectively placed from a top of the thermal electrode 12 to bottom of the thermal electrode 12, and are respectively connected to the detecting array 44 of the thermal sensing module 40. By said means, temperatures at each depth of the material can be detected, and situations at each depth of the material also can be promptly handled.

As stated above, the material volume and thermal information are respectively obtained by the material electrodes 11 and the thermal electrode 12 of the probe 10. The material volume and thermal information are respectively processed by the volume sensing module 30 and the thermal sensing module 40, and both are transmitted to the control module 20. Correct material information is calculated by the control module 20. Then, the correct material information is transmitted to the external computer or the central control console by cable transmission or wireless transmission for monitoring. The control module 20 converts the digital signal to obtain material volume based on radio frequency admittance. The rated voltage is applied at the material electrodes 11. The volume sensing module 30 detects the current deviation between the material electrodes 11 and the ground potential. A storage amount of the material is calculated by the control module 20 from the current deviation. Therefore, the material volume can be obtained by the control module 20 and based on radio frequency admittance for detecting material depth or liquid-level. Even though the material is changed, the sensing device does not have to be changed and can keep on monitoring. Steel cable is used as the material of the material electrodes 11 of the probe 10, and provides better impact resistant ability and loading ability, so the sensing device of this invention can detect material depth, liquid-level, and temperature.

What is claimed is:

1. A sensing device for detecting material depth, liquid-level, and temperature, wherein the sensing device comprises:
    a probe comprising two material electrodes and a thermal electrode;
    a control module comprising at least one thermal signal input terminal, at least one volume signal input terminal, multiple signal output terminals, and a power input terminal;
    a volume sensing module comprising:
        a first analog-digital converter having an output terminal connected to the volume signal input terminal of the control module;
        a first signal processing unit processing a signal from the probe and transmitting the signal to the control module via the first analog-digital converter; and
        a waveform generating unit controlled by the control module, and outputting a signal to the material electrodes of the probe for measurement based on radio frequency admittance;
    a thermal sensing module comprising:
        a second signal processing unit processing a thermal signal from the thermal electrode of the probe; and
        a second analog-digital converter having an input terminal connected to an output terminal of the second signal processing unit, converting the thermal signal to a digital signal, and transmitting the digital signal to the control module;
    an output module comprising:
        a signal input terminal connected to part of the multiple signal output terminals of the control module; and
        a signal output terminal; and
    a power module comprising at least one DC to DC converter for providing working power to the control module, the volume sensing module, the thermal sensing module, the probe, and the output module;
    wherein the two material electrodes are made out of steel cable and surround the thermal electrode, the two material electrodes are provided with a rated voltage by the power module, a triggering signal is generated by the waveform generating unit and applied to the two material electrodes, the volume sensing module detects a current deviation between the two material electrodes and a ground potential, and a volume signal is generated from the triggering signal based on the deviation of the current between the two material electrodes and a ground potential, the volume signal is converted to a digital signal and outputted to the control module; the control module converts the digital signal to obtain material volume based on radio frequency admittance.

2. The sensing device as claimed in claim 1, wherein the sensing device further comprises:
    a wireless transmission module transmitting data by a wireless transmission protocol; and
    a user interface comprising a display unit and an input unit.

3. The sensing device as claimed in claim 2, wherein the input unit is a keyboard.

4. The sensing device as claimed in claim 2, wherein the input unit is a touch panel.

5. The sensing device as claimed in claim 1, wherein the material electrodes and the thermal electrode of the probe are in the form of long rods; the thermal electrode is connected between the two material electrodes; multiple thermal sensors are placed from a top of the thermal electrode to a bottom of the thermal electrode.

6. The sensing device as claimed in claim 5, wherein the sensing device further comprises:
    a wireless transmission module transmitting data by a wireless transmission protocol; and
    a user interface comprising a display unit and an input unit.

7. The sensing device as claimed in claim 6, wherein the input unit is a keyboard.

8. The sensing device as claimed in claim 6, wherein the input unit is a touch panel.

9. The sensing device as claimed in claim 5, wherein the thermal sensing module comprises:
    a detecting array respectively connected to each thermal sensor mounted on the thermal electrode; and
    a switching unit controlled by the control module, and outputting signals to the detecting array for adjusting thermal sensing sensitivity.

10. The sensing device as claimed in claim 9, wherein the sensing device further comprises:
    a wireless transmission module transmitting data by a wireless transmission protocol; and
    a user interface comprising a display unit and an input unit.

11. The sensing device as claimed in claim 10, wherein the input unit is a keyboard.

12. The sensing device as claimed in claim 10, wherein the input unit is a touch panel.

13. The sensing device as claimed in claim 9, wherein the volume sensing module further comprises:
    an isolated signal processor connected to the probe; and
    an analog signal isolator comprising:
        two input terminals respectively connected to an output terminal of the isolated signal processor and an output terminal of the waveform generating unit; and
        two output terminals respectively connected to an input terminal of the isolated signal processor and an input terminal of the first signal processing unit.

14. The sensing device as claimed in claim 13, wherein the sensing device further comprises:
    a wireless transmission module transmitting data by a wireless transmission protocol; and
    a user interface comprising a display unit and an input unit.

15. The sensing device as claimed in claim 14, wherein the input unit is a keyboard.

16. The sensing device as claimed in claim 14, wherein the input unit is a touch panel.

17. The sensing device as claimed in claim 13, wherein the thermal sensing module comprises a digital signal isolator.

18. The sensing device as claimed in claim 17, wherein the sensing device further comprises:
    a wireless transmission module transmitting data by a wireless transmission protocol; and
    a user interface comprising a display unit and an input unit.

19. The sensing device as claimed in claim 18, wherein the input unit is a keyboard.

20. The sensing device as claimed in claim 18, wherein the input unit is a touch panel.

* * * * *